(12) United States Patent
Schmidt et al.

(10) Patent No.: US 6,400,874 B1
(45) Date of Patent: Jun. 4, 2002

(54) OPTICAL CABLE

(75) Inventors: Ilona W. Schmidt, Roedental; Reiner Schneider, Ebersdorf, both of (DE)

(73) Assignee: Corning Cable Systems, LLC, Hickory, NC (US)

( * ) Notice: Subject to any disclaimer, the term of this patent is extended or adjusted under 35 U.S.C. 154(b) by 0 days.

(21) Appl. No.: 09/610,734

(22) Filed: Jul. 6, 2000

(51) Int. Cl.$^7$ .................................................. G02B 6/44
(52) U.S. Cl. ...................................... 385/109; 385/107
(58) Field of Search ............................... 385/109, 113, 385/110, 100, 107

(56) References Cited

U.S. PATENT DOCUMENTS 5,392,374 A * 2/1995 Gorian et al. ............... 385/100

FOREIGN PATENT DOCUMENTS

| DE | 195 17 392 A1 | 11/1996 | ............ G02B/6/44 |
|---|---|---|---|
| EP | 0 500 296 A1 | 8/1992 | ............ G02B/6/44 |
| EP | 0 708 455 A1 | 4/1996 | ............ H01B/7/34 |
| EP | 0 883 008 A1 | 12/1998 | ............ G02B/6/44 |
| GB | 2 138 168 A | 10/1984 | ............ G02B/5/14 |

OTHER PUBLICATIONS

Patent Abstract of Japan; 60079311; May 7, 1985.
Patent Abstract of Japan; 04162007; Jun. 5, 1992.

* cited by examiner

*Primary Examiner*—Brian Sircus
*Assistant Examiner*—Chandrika Prasad

(57) ABSTRACT

The optical cable essentially comprises a core (2), containing at least one optical conductor (3), a non-combustible support element (4) surrounding the core (2) in the shape of a tube or cylinder, a fireproofing layer (6) arranged on the support element (4) and a sheath (8, 12) containing a thermal insulation layer (10). A material solidifying under the action of heat serves as fireproofing layer (6).

8 Claims, 1 Drawing Sheet

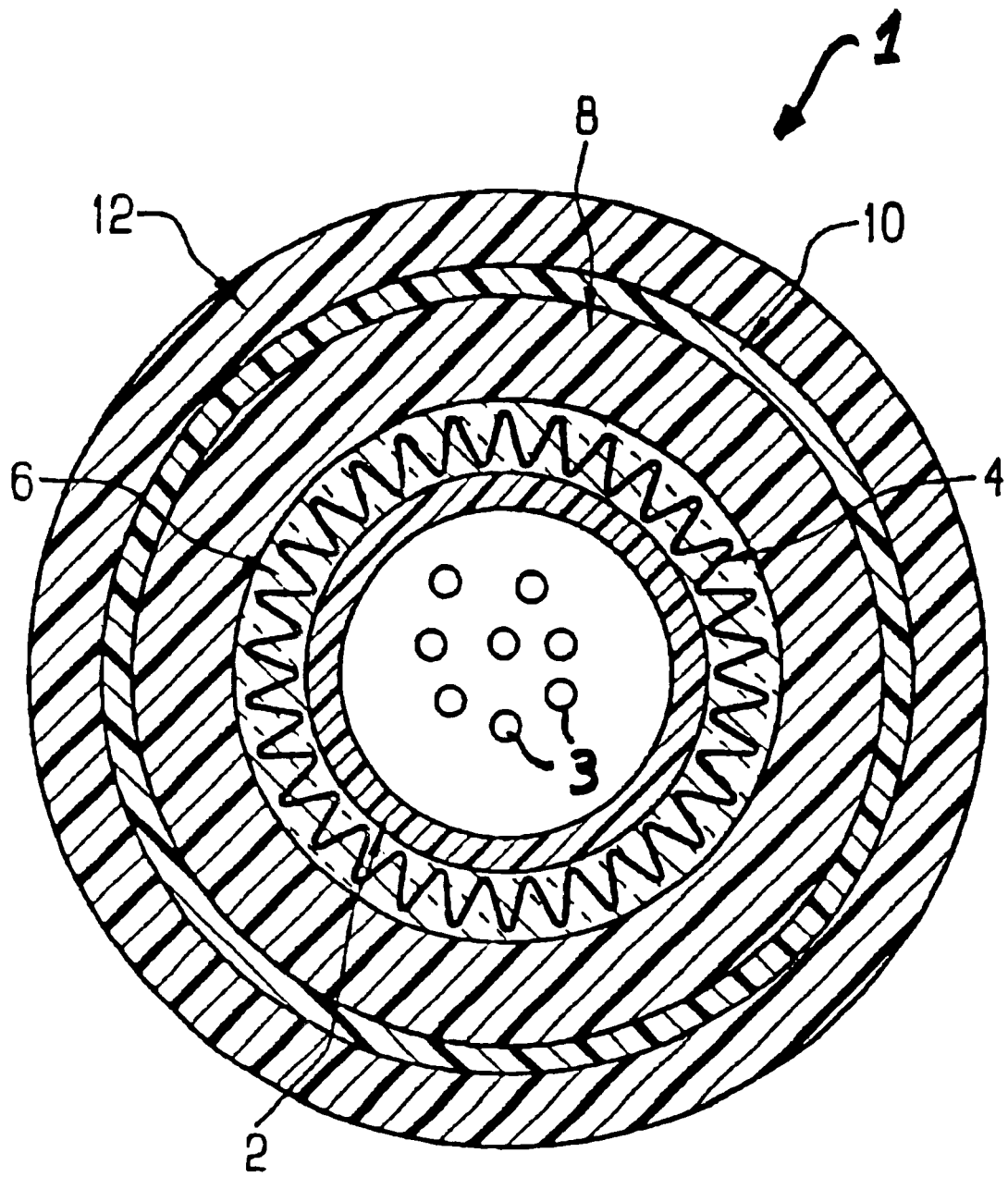

OPTICAL CABLE

The present invention relates to an optical cable in accordance with the preamble of Patent claim 1.

The construction in airports and other service centres of a modern data and communications network satisfying high safety standards necessitates the use and laying of large quantities of cables whose function and mechanical strength are largely maintained in the case of a fire. Moreover, it must be ensured that the flames cannot spread through cable ducts into other parts of buildings, that the combustion gases possibly released are non-toxic, and that the density of the ensuing smoke satisfies the so-called low-smoke conditions.

Data and communication cables having appropriate properties are disclosed, for example, in EP 0 708 455 A1, GB 2 138 168 B or DE 195 17 392 A1. Because of their complex structure, the production of these cables is, however, comparatively complicated and associated with high costs. Moreover, during a fire combustible gases are produced which escape from the cable core and can contribute to spreading of the flames.

The aim of the invention is to create an optical cable which continues to function in the case of fire. At the same time, the spreading of the flames is to be prevented or at least distinctly delayed. This object is achieved by means of a cable having the features of Patent Claim 1. Expedient refinements and developments of the optical cable are the subject matter of the dependent claims.

The proposed optical cable essentially comprises a core containing a plurality of optical conductors (LWL), a non-combustible support element surrounding the core in the shape of a tube or cylinder, a fireproofing layer arranged on the support element and a sheath containing a thermal insulation layer. A material which solidifies under the action of heat and covers at least one side of the support element serves as fireproofing layer.

In a further variant, it is also possible to provide two support elements enclosing the fireproofing layer. Metal sheets, foils, tapes, meshes, grids or structures in the form of gratings came particularly into consideration as support elements.

The support element is preferably corrugated or folded so that in the case of a fire it is formed or deformed very easily and without being damaged and does not allow the possibly combustible gases produced in the cable core to escape to the outside.

Further advantages and features of the invention are to be gathered from the following description and the drawing, in which a preferred exemplary embodiment of the optical cable is illustrated in cross section.

The optical cable 1 illustrated in cross section in FIG. 1 essentially comprises a centrally arranged loose buffer, a support element 4 provided on one or both sides with a fireproofing layer 6, and a multilayer sheath concentrically sheathing the loose buffer and the coated support element. The outside diameter of the cable 1 is typically 6–13 mm. The loose buffer serving as optical transmission element contains a total of N=2–24 optical conductors 3 arranged in a plastic tube 2 consisting particularly of PC or PP (outside diameter of typically 1.4–6 mm). A non-combustible, slightly thixotropic mass additionally protects the optical conductors 3, which are inserted with excess length in the loose buffer 2, against external mechanical effects.

Metal sheets or foils, tapes and gratings made from metal (for example aluminum) are suitable as support element 4 for the material of the fireproofing layer 6 which solidifies under the action of heat. Corrugated or folded metal sheets or foils embracing the loose buffer in the shape of a tube or cylinder lend the cable 1 additional mechanical stability. Moreover, under the action of heat such structures can expand and deform to a much greater extent without being damaged than cylindrical support elements 4 which lack any further structure. It is, of course, entirely possible also to make use as support element 4 of meshes of glass fibre or woven glass tape.

The protective layer 6 adhering to the support element 4 consists of a material solidifying under the action of heat, for example of the composition described in EP 0 708 455 and containing an organo-silicon polymer, a ceramicizable filler and a wetting agent. Mica-coated glass-fibre of woven-glass tapes exhibit a similar behaviour under the action of heat.

Both the inner sheath 8 and the outer sheath 12 of the optical cable 1 preferably consist of an FRNC (flame retardant non-corrosive) material, for example of a polymer (for example polyolefines such as PE, PP or ethylene copolymers such as EVA or mixtures of these polymers) filled with metal hydroxides, (for example Al-hydroxide). It is, of course, also possible to produce the inner sheath 8 from a flame-retardant or else non-flame-retardant polymer (PE, PP) filled only with chalk.

The thermal insulation layer 10 arranged between the inner and outer sheaths is intended to protect the sensitive loose buffer for as long as possible against the heat generated by a fire. The thermal insulation layer therefore preferably consists of a silicone polymer, in particular of an extruded silicone rubber. Woven-glass or glass-fibre tapes or mineral fabrics/tapes can likewise serve as insulating layer 10.

Of course, the invention is not limited to the exemplary embodiment described above. Thus, it is possible straightaway to strand the optical conductors 3 to form a unit (multifibre unit),

- to make use of so-called optical conductor ribbons or ribbon stacks instead of individual, possibly stranded optical conductors 3,
- to replace the loose buffer or multifibre unit by a so-called tightly-buffered fibre, in particular a plastic buffered fibre, and to embed tensile load members and/or strength members in the sheath, preferably the outer sheath 12.

What is claimed is:

1. Optical cable having a core containing at least one optical conductor, and a sheath of multi-layer construction surrounding the at least one optical conductor, said optical cable comprising: a fireproofing layer arranged on at least one non-combustible support element, said fireproofing layer and said at least one support element being located between said sheath and said at least one optical conductor, said fireproofing layer comprising a material which solidifies under the action of heat, and said at least one support element comprising a metal sheet or foil, or grating.

2. Optical cable according to claim 1, the support element surrounding the core in the shape of a tube or cylinder.

3. Optical cable according to claim 1 or 2, wherein the support element is coated on one side or both sides with the material solidifying under the action of heat.

4. Optical cable according to claim 1, the support element being folded or corrugated.

5. Optical cable according to claim 1, a thermally insulating layer being arranged between an inner and an outer sheathing layer.

6. Optical cable according to claim 1, the inner sheathing layer being arranged directly on the fireproofing layer.

7. Optical cable according to claim 1, at least one said optical conductor being in the form of a loose buffer, a multifibre unit or a tightly-buffered fibre.

8. Optical cable according to claim 1, the at least one optical conductor being arranged in a non-combustible, thixotropic mass.

* * * * *